(12) United States Patent
Wang et al.

(10) Patent No.: US 11,180,649 B1
(45) Date of Patent: Nov. 23, 2021

(54) NANOSILICA-ORGANIC POLYMER COMPOSITE LATEX

(71) Applicant: THE SHERWIN-WILLIAMS COMPANY, Cleveland, OH (US)

(72) Inventors: Zhiyu Wang, Solon, OH (US); James M Reuter, Cleveland Heights, OH (US); Shailesh S. Shah, Westlake, OH (US); Peter J. Mackulin, North Olmsted, OH (US); Benjamin M. Borns, Olmsted Township, OH (US); Margaret A. Patterson, Cleveland, OH (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 0 days.

(21) Appl. No.: 14/972,311

(22) Filed: Dec. 17, 2015

Related U.S. Application Data

(60) Provisional application No. 62/094,362, filed on Dec. 19, 2014.

(51) Int. Cl.
C08L 33/14 (2006.01)
C09D 133/14 (2006.01)
C07F 7/18 (2006.01)

(52) U.S. Cl.
CPC ............ C08L 33/14 (2013.01); C07F 7/1804 (2013.01); C09D 133/14 (2013.01)

(58) Field of Classification Search
CPC ..................................................... C08L 33/14
See application file for complete search history.

(56) References Cited

U.S. PATENT DOCUMENTS

| 5,280,054 A * | 1/1994 | Sakai ................... C09D 151/10 523/500 |
| 6,160,067 A * | 12/2000 | Eriyama ................ B82Y 30/00 427/214 |
| 6,825,239 B2 * | 11/2004 | Wilhelm ........... C08F 222/1006 522/183 |
| 8,815,981 B2 * | 8/2014 | Yang ..................... C09D 151/10 523/203 |
| 2004/0156994 A1 * | 8/2004 | Wiese ....................... C08K 3/01 427/372.2 |
| 2007/0135567 A1 * | 6/2007 | Ruhoff ................. C09D 133/14 525/55 |
| 2009/0318598 A1 * | 12/2009 | Perez .................... C08F 220/06 524/261 |

FOREIGN PATENT DOCUMENTS

| WO | 2004035473 | 4/2004 |
| WO | 2004035474 | 4/2004 |

* cited by examiner

Primary Examiner — Vickey Nerangis

(57) ABSTRACT

An aqueous dispersion comprising:
(a) a latex binder, wherein the latex binder comprises:
(i) about 1-25% by weight of a monomer having latent crosslinking functionality,
(ii) 0.1 to about 15% of an acid functional monomer,
(iii) about 1 to about 25% ethylenically functional silica,
(iv) and about 35 to 97.9% other monomers; and
(b) an aqueous unsaturated silane treated silica dispersion, wherein the unsaturated silane treated silica dispersion comprises colloidal ethylenically unsaturated silica particles having an average particle size less than about 100 nm.

2 Claims, No Drawings

NANOSILICA-ORGANIC POLYMER COMPOSITE LATEX

This application claims the benefit of U.S. Provisional patent application No. 60/094,362 filed on Dec. 19, 2014, the entirety of which is hereby incorporated by reference.

This invention relates to a solvent-free process for treating silica to make it more organophilic and to impart ethylenically unsaturated reactive sites to the silica particles. This invention also relates to novel nanosilica-organic polymer composite latexes obtained by producing, for example by emulsion polymerization, a latex polymer by reacting unsaturated monomers with the unsaturated groups on the treated silica thereby incorporating the silica into the latex polymer. Because the synthesis of the organophilic silica is free of added organic solvent, there is no need for removal of the organic solvents typically used in many prior art silica treatment processes. Furthermore, since the silica treatment process is solvent-free, the subsequent latex synthesis can, if desired, be accomplished in the same reaction vessel as the silica treatment thereby eliminating the time, handling and separation requirements of many prior art approaches. This invention greatly simplifies the process of producing a stable, VOC-free latex polymer, and low or zero VOC coatings incorporating such as latex.

1. Ethylenically Unsaturated Silane Treated Silica

The ethylenically unsaturated silica can be prepared by a process which comprises admixing:
  (a) a polyalkoxy silane having ethylenic unsaturation;
  (b) an aqueous silica dispersion;
  (c) a non-ionic surfactant; and
  (d) a base;
wherein the base is present at a level to provide a pH of at least 8.5, and for same applications, between about 9.0 and 11.5, and wherein the process is substantially free of organic solvents and wherein the process is conducted at a temperature of at least 70° C., and for some applications at least 75° C. The base can be an amine such as ammonium hydroxide, or an inorganic base such as sodium hydroxide.

The silica will typically be provided as an aqueous silica dispersion. The silica may have an average particle size less than about 100 nm and often less than about 50 nm. In order to obtain a VOC-free process, the silica dispersion should be free of any added organic solvents.

Representative ethylenically unsaturated silanes include (meth)acrylate functional silanes such as 3-acryloxypropyltrimethoxysilane, 2-methacryloxyethyltrimethoxysilane, 2-acryloxyethyltrimethoxysilane, 3-methacryloxypropyltriethoxysilane, 2-methacryloxyethyltriethoxysilane, 2-acryloxyethyltriethoxysilane, gamma glycidoxypropyltrimethoxysilane, and gamma methacryloxypropyltrimethoxysilane, and vinyl functional silanes such as vinyltrimethoxysilane, vinyltriethoxysilane, and vinyltri(2-methoxyethoxy)silane. For some embodiments, dialkoxysilanes, such as vinylmethyldimethoxysilane and vinylmethyldiethoxysilane, and monoalkoxysilanes could also be used as partial or total replacements for the trialkoxysilanes. For some embodiments the trialkoxy (meth)acrylate silanes are useful.

In order to minimize the potential self-condensation of the silanes, and in order to minimize the possibility of gel formation during subsequent polymerization of the ethylenically unsaturated silica and unsaturated monomers to produce a latex polymer, it is often preferable to provide a relatively low level of silane treatment. For many applications, the amount of ethylenically unsaturated silane use to treat the silica will typically be at a level of less than about 2.0% by weight of the weight of the solid silica, and often will be at a level to provide less than about 1.0%, and sometimes less than about 0.5%, and sometimes less than 0.3% by weight of the weight of the silica. For some applications the silane will be present at least 0.05% of the weight of the silica, and for some applications will range from about 0.075 to about 1.0%.

Non-ethylenically unsaturated silanes such as methyltrimethoxysilane, propyltriethoxysilane, methyltriisopropoxysilane, gamma chloropropyltrimethoxysilane, gamma glycidoxypropyltriethoxysilane, beta-glycidoxyethyltrimethoxysilane, 3,3,3-trifluoropropyltrimethoxysilane, 3,4-epoxycyclohexylethyltriethoxysilane, phenyltrimethoxysilane, vinyltriethoxysilane, vinyltrimethoxyethoxysilane, N-beta (aminoethyl) gamma-aminopropyltrimethoxysilane, gamma-mercaptopropyltrimethoxysilane, and beta-cyano ethyltriethoxysilane, etc. can be used in combination with the unsaturated silanes if desired.

The ethylenically unsaturated treated silica can be conveniently prepared by admixing the silane and an aqueous silica dispersion in a condenser equipped reaction vessel in the presence of a non-ionic surfactant and a base at temperatures ranging up to about 120'C, and typically at temperatures ranging between about 70° C. and 100° C. to complete the reaction. Typically the reaction can be completed at these temperatures in 60 minutes or less to provide the ethylenically unsaturated treated silica product. The aqueous reaction product can then be used as a raw material in a subsequent polymerization reaction to produce a latex polymer.

2. Nanosilica-Organic Polymer Composite Latex

The unsaturated silane treated silica particles can be incorporated into polymers by polymerization through the ethylenic unsaturation. In one embodiment the silica particles are incorporated into a latex polymer by any method known in the art, such as by emulsion polymerization of the unsaturated silica and one or more ethylenically unsaturated monomers. In one particular embodiment, the latex can be obtained by polymerizing the unsaturated silica with monomers having latent reactive functionality.

Preparation of latex compositions is well known in the paint and coatings art. Any of the well known free-radical emulsion polymerization techniques, such as emulsion polymerization use to formulate latex polymers can be used in the present invention. Such procedures include, for example, single feed, core-shell, and inverted core-shell procedures which produce homogeneous or structured particles.

The latex polymers produced in accordance with the present invention (also referred to herein as "binders") include those polymers polymerized from the ethylenically unsaturated treated silica and one or more suitable monomers. Typically, the binders are polymerized from one or more copolymerizable monoethylenically unsaturated monomers such as, for example, vinyl monomers and acrylic monomers.

The vinyl monomers suitable for use in accordance with the present invention include any compounds having vinyl functionality, i.e., ethylenic unsaturation, exclusive of compounds having acrylic functionality, e.g., acrylic acid, methacrylic acid, esters of such acids, acrylonitrile and acrylamides. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl benzoates, vinyl isopropyl acetates and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene, and vinyl alkyl ethers, such as, for example, methyl vinyl ether, isopropyl vinyl ether, n-butyl vinyl ether, and isobutyl vinyl ether.

The acrylic monomers suitable for use in accordance with the present invention comprise any compounds having acrylic functionality. Preferred acrylic monomers are selected from the group consisting of alkyl acrylates, alkyl methacrylates, acrylate acids and methacrylate acids as well as aromatic derivatives of acrylic and methacrylic acid, acrylamides and acrylonitrile. Typically, the alkyl acrylate and methacrylic monomers (also referred to herein as "alkyl ester of acrylic or methacrylic acid") will have an alkyl ester portion containing from 1 to about 18, preferably about 1 to 8, carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, and 1-adamantyl methacrylate.

In addition to the specific monomers described above, those skilled in the art will recognize that other monomers such as, for example, allylic monomers, or monomers which impart wet adhesion, such as monomers having tertiary amine, ethylene ureido, or N-heterocyclic groups, can be used in place of, or in addition to, the specifically described monomers in the preparation of the binders. Representative wet adhesion promoting monomers include methacrylamidoethyl ethylene urea, dimethylaminoethyl methacrylate, vinyl imidizole and 2-ethyleneuriedo-ethyl methacrylate. The amount of such other monomers is dependent on the particular monomers and their intended function, which amount can be determined by those skilled in the art. In one embodiment of this invention, a wet adhesion promoting monomer, if desired, could be present at levels ranging up to about 5% of the total monomer mix by weight.

In the preparation of latent crosslinkable polymers, the monomer mix polymerized to create the binder resin of the present invention will comprise at least one ethylenically unsaturated monomer containing "latent crosslinking" capabilities, which as used herein means a monomer which possesses the ability to further react with a crosslinker some time after initial formation of the polymer. The crosslinking reaction can occur through the application of energy, eg., through heat or radiation. Also, dying can activate the crosslinking polymer through changes in pH, oxygen content, evaporation of solvent or carrier, or other changes that causes a reaction to occur. The particular method of achieving crosslinking in the binder polymer is not critical to the present invention. A variety of chemistries are known in the art to produce crosslinking in latexes.

Representative examples of latent crosslinking carbonyl-containing monomers include acrolein, methacrolein, diacetone acrylamide, diacetone methacrylamide, 2-butanone methacrylate, formyl styrol, diacetone acrylate, diacetone methacrylate, acetonitrile acrylate, acetoacetoxyethyl methacrylate, acetoacetoxyethyl acrylate and vinylacetoacetate. These monomers normally do not affect crosslinking until during final film formation, for example, when the aqueous polymer emulsion simultaneously contains an appropriate added amount of a polyamine compound as crosslinker. Particularly suitable compounds of this type are the dihydrazides and trihydrazides of aliphatic and aromatic dicarboxylic acids of 2 to 20 carbon atoms. Polyamine compounds useful as crosslinkers for the carboxyl functional groups include those having an average of at least two carbonyl-reactive groups of the formula —$NH_2$ and carbonyl reactive groups derived from such groups. Examples of useful amine functional groups include R—$NH_2$, R—O—$NH_2$, R—O—N=C<, R—NH—C(=O)—O—$NH_2$, wherein R is alkylene, alicyclic or aryl and may be substituted. Representative useful polyamines include ethylene diamine, isophorone diamine, diethylenetriamine and dibutylenetriamine. In one embodiment of this invention it is useful to utilize polyhydrazides as the polyamine compounds. Representative useful polyhydrazides include oxalic dihydrazide, adipic dihydrazide, succinic dihydrazide, malonic dihydrazide, glutaric dihydrazide, phthalic or terephthalic dihydrazide and itaconic dihydrazide. Additionally, water-soluble hydrazines such as ethylene-1,2-dihydrazide, propylene-1,3-dihydrazide and butylene-1,4-dihydrazide, can also be used as one of the crosslinking agents Additional building blocks which are suitable for postcrosslinking are those which contain hydrolyzable organosilicon bonds. Examples are the copolymerizable monomers methacryloyloxypropyltrimethoxysilane and vinyltrimethoxysilane.

Epoxy-, hydroxyl- and/or N-alkylol-containing monomers, for example, glycidyl acrylate, N-methylolacrylamide and -methacrylamide and monoesters of dihydric alcohols with $\alpha,\beta$-monoethylenically unsaturated carboxylic acids of 3 to 6 carbon atoms, such as hydroxyethyl, hydroxy-n-propyl or hydroxy-n-butyl acrylate and methacrylate are also suitable for postcrosslinking. Primary or secondary amino containing acrylates or methacrylates such as t-butyl amino ethyl methacrylate are also suitable.

In one embodiment the binder resin contains about 1.0 to about 25% by weight, based on the total weight of the polymer, of at least one monomer having latent crosslinking functionality.

In one embodiment of the present invention, the binder resin is an acid functional latex. Specific acid functional monomers suitable for use in accordance with the present invention include, for example, acrylic acid, methacrylic acid, ethacrylic acid, itaconic acid, maleic acid, dimeric acrylic acid or the anhydrides thereof. Besides carboxylic acids and anhydrides, monomers possessing other acid groups such as sulfonic or phosphoric acid groups are also useful. Representative monomers include ethylmethacrylate-2-sulfonic acid, 2-acrylamido-2-methylpropane sulfonic acid, 2-methyl-2-propenoic acid ethyl-2-phosphate ester (HEMA-phosphate), (1-phenylvinyl)-phosphonic acid, or (2-phenylvinyl)-phosphonic acid. Mixtures of acids are also practical.

Typically, the particle size of the binder resins is from about 0.1 to 1.0 microns. The Tg of the binder resin of the present invention is typically from about −60 to 100'C. Binder resins having a Tg less than about 20'C typically require less volatile organic compounds (solvents and coalescents) to form a smooth film compared to higher Tg polymers. In one useful embodiment the Tg would be less than about 10'C. In another useful embodiment the Tg is less than about 1'C. As used herein the term "Tg" means polymer glass transition temperature.

In one useful embodiment the binder resin would be obtained by polymerizing a monomer mixture of about 1-25% by weight of a monomer having latent crosslinking functionality, 0.1 to about 15% of an acid functional monomer, about 1 to about 25% ethylenically functional silica and about 35 to 97.9% other monomers. In another useful embodiment the monomer mixture would also comprise about 0.1 to about 10% of a wet adhesion promoting monomer. The crosslinker for reaction with the latent crosslinking functionality need only be present in an amount necessary to achieve the desired degree of cure. Typically, the crosslinker will be present at a level to provide at least 0.1 equivalent for each equivalent of latent crosslinking functionality.

In one embodiment, the crosslinker would be present at a level to provide between about 0.2 to about 2.0 equivalents for each equivalent of latent crosslinking functionality. In one useful embodiment the crosslinker is present at a level to provide 0.4 to about 1.2 equivalents for each equivalent of latent crosslinking functionality.

In another useful embodiment the crosslinker is present at a level to provide 0.4 to about 1.0 equivalent for each equivalent of latent crosslinking functionality.

The latex polymers of this invention can be utilized as water-based coating compositions as is known in the art. Such coating compositions may typically incorporate at least one pigment. Representative pigments include, for example, titanium dioxide, carbon black, graphite, ceramic black, lamp black, antimony sulfide, black iron oxide, aluminum pastes, yellow iron oxide, red iron oxide, iron blue, phthalo blue and green, nickel titanate, dianisidine orange, dinitroaniline orange, imidazole orange, quinacridone red, violet and magenta, toluidine red, molybdate orange, and the like. Extender pigments, such as amorphous, diatomaceous, fumed, quartz and crystalline silica, clays, aluminum silicates, magnesium aluminum silicates, talc, mica, delaminated clays, calcium carbonates and silicates, gypsum, barium sulfate, calcium zinc molybdates, zinc oxide, phosphosilicates and borosilicates of calcium, barium and strontium, barium metaborate monohydrate, and the like can also be incorporated.

Suitable dispersants and surfactants for use in the coatings of this invention can comprise any of the dispersants and surfactants readily available to the coatings industry, including the anionic and nonionic surfactants, soya lecithin, alkyl ammonium salts of fatty acids, amine salts of alkyl aryl sulfonates, unsaturated organic acids, sulfonated castor oil, mixtures of high boiling point aromatic and ester solvents, sodium salts of aryl sulfonic acid, and the like.

Suitable rheology modifiers which optionally can be included in the coatings of this invention representatively include cellulosics, organclays, fumed silica, calcium soyate, associative thickeners and the like. Suitable solvents, if desired, for coatings of this invention include solvents which are stably miscible with the water based coatings and representatively include, alcohols, ethers, esters, glycol ethers, glycol ether esters, hydrocarbons, etc. For many embodiments, it is preferred to minimize the presence of organic solvents.

Coatings made from the crosslinkable latex polymers will also include the crosslinker as described above.

As used herein, unless otherwise stated, the term "parts" means parts by weight, NVM is solids by weight.

EXAMPLE 1

Preparation of Unsaturated Silane Treated Silica

To a reaction vessel containing a mixture of 720 parts water, 1.1 parts ammonium hydroxide, 6 parts of a non-ionic surfactant (Antarox® BL-240 Linear alcohol ethylene oxide propylene oxide polymer from Rhodia) and 5087 parts of a silica dispersion (Ludox® AS-40 40% NVM colloidal silica from W.R. Grace), is added dropwise at room temperature with vigorous stirring, 0.536 parts gamma-methacryloxy-propyltriisopropoxysilane. The temperature was then raised to 82° C. and held for 30 minutes to produce the silane treated silica. This reaction product was used as is to produce a latex polymer as shown in Example 2.

EXAMPLE 2

A latex incorporating the treated silica was then prepared by the following process. To the above reaction vessel containing the silane treated silica without any additional separation or purification, a mixture of 3.5 Rhodafac® RS-610 (anionic surfactant from Rhodia) with 30 parts water and 1.8 parts ammonium hydroxide was pumped in at high speed. The temperature was maintained at 82° C. and, under a nitrogen purge, a monomer pre-emulsion 17 parts Rhodafac® RS-610, 23 parts PAM-200® (phosphate ester of polypropylene glycol monomethacrylate from Rhodia), 46 parts diacetone acrylamide, 660 parts water, 8.5 parts ammonium hydroxide, 5.6 parts methacrylic acid, 224 parts methyl methacrylate, 612 parts butyl acrylate and 253 parts styrene and an initiator solution (3.7 parts ammonium persulfate and 270 parts water) were slowly fed in over a period of 3.5 hours. The reaction mixture was maintained under agitation for 70 minutes after which the temperature was lowered to 65'C and a mixture of 1.1 parts sodium metabisulfite in 25 parts water was slowly added over a period of 1 hour and held for an additional 30 minutes to reduce residual monomers. The latex was then admixed with 17 parts adipic dihydrazide to yield a cross-linkable composite latex.

For comparison, a similar latex preparation was conducted in which the silane and silica were added to the reaction vessel, but not prereacted, followed by the addition of the monomer pre-emulsion as above. This preparation became a gel-like mass within 20 hours. Another comparative example was conducted by initially adding just the silica to the reaction vessel and then incorporating the silane into the monomer pre-emulsion mixture. This reaction product also became gel-like within 2 hours.

While this invention has been described by a specific number of embodiments, it is obvious that other variations and modifications may be made without departing from the spirit and scope of the invention as set forth in the appended claims.

The invention claimed is:

1. An aqueous dispersion comprising a latex binder, wherein the latex binder comprises a polymerization reaction product of:
   (i) about 1-25% by weight of a monomer having latent crosslinking functionality, (ii) 0.1 to about 15% by weight of an acid functional monomer, (iii) about 1 to about 25% by weight of an aqueous unsaturated alkoxy silane treated silica dispersion, wherein the unsaturated alkoxy silane treated silica dispersion comprises colloidal ethylenically unsaturated silica particles having an average particle size less than about 100 nm, the colloidal ethylenically unsaturated silica particles formed by a process which comprises admixing:
- (a) a polyalkoxy silane having ethylenic unsaturation selected from the group consisting of 3-acryloxypropyltrimethoxysilane, 2-methacryloxyethyltrimethoxysilane, 2-acryloxyethyltrimethoxysilane, 3-methacryloxypropyltriethoxysilane, 2-methacryloxyethyltriethoxysilane, 2-acryloxyethyltriethoxysilane, gamma glycidoxypropyltrimethoxysilane, gamma methacryloxypropyltrimethoxysilane, vinyltrimethoxysilane, vinyltriethoxysilane, vinyltri(2-methoxyethoxy)silane, vinylmethyldimethoxysilane, vinylmethyldiethoxysilane, and mixtures thereof;
- (b) an aqueous silica dispersion;
- (c) a non-ionic surfactant; and
- (d) a base, (iv) about 35 to 97.8% by weight other monomers, and (v) a crosslinker.

2. The coating composition of claim 1 wherein the monomer having latent crosslinking functionality comprises diacetone acrylamide.

\* \* \* \* \*